United States Patent
Chandolu et al.

(10) Patent No.: US 9,189,643 B2
(45) Date of Patent: Nov. 17, 2015

(54) CLIENT BASED RESOURCE ISOLATION WITH DOMAINS

(71) Applicant: International Business Machines Corporation, Armonk, NY (US)

(72) Inventors: Uma M Chandolu, Bangalore (IN); Ranganathan Vidya, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 152 days.

(21) Appl. No.: 13/685,546

(22) Filed: Nov. 26, 2012

(65) Prior Publication Data

US 2014/0150066 A1    May 29, 2014

(51) Int. Cl.
- G06F 7/04 (2006.01)
- G06F 21/62 (2013.01)
- H04L 29/12 (2006.01)
- H04L 29/06 (2006.01)

(52) U.S. Cl.
CPC .......... G06F 21/6218 (2013.01); H04L 63/101 (2013.01); *H04L 61/1523* (2013.01); *H04L 63/0876* (2013.01)

(58) Field of Classification Search
CPC ... G06F 21/30; G06F 21/6218; H04L 63/101; H04L 63/0876
USPC ........................ 726/1, 2, 4; 713/164, 167, 168
See application file for complete search history.

(56) References Cited

U.S. PATENT DOCUMENTS

| | | | |
|---|---|---|---|
| 5,889,952 A | 3/1999 | Hunnicutt et al. | |
| 6,519,647 B1 | 2/2003 | Howard et al. | |
| 6,947,989 B2 | 9/2005 | Gullotta et al. | |
| 7,017,183 B1 | 3/2006 | Frey et al. | |
| 7,167,983 B1 | 1/2007 | Tiller et al. | |
| 7,249,176 B1 | 7/2007 | Salas et al. | |
| 7,328,210 B2 | 2/2008 | Barchi et al. | |

(Continued)

FOREIGN PATENT DOCUMENTS

| WO | WO2009023586 A2 | 2/2009 |
|---|---|---|
| WO | WO2010127380 A1 | 11/2010 |

OTHER PUBLICATIONS

IBM, "Welcome to the AIX 6.1 Information Center", http://publib.boulder.ibm.com/infocenter/aix/v6rl/index.jsp?topic=/com.ibm.aix.doc/base/aixinformation.htm, accessed on Aug. 3, 2010, published in 1989, 1 page.

(Continued)

*Primary Examiner* — Samson Lemma
(74) *Attorney, Agent, or Firm* — Yee & Associates, P.C.; Parashos Kalaitzis

(57) ABSTRACT

A method may comprise determining, in an operating system instance, that an access control is being attempted to control an object by a user from a first client of a plurality of clients. Domain and client identifiers associated with the user may be determined. Any domain identifiers from a set and any client identifiers from a set may be accessed that may be associated with the object, where the domain identifiers may uniquely identify one or more domains and the client identifiers may uniquely identify one or more clients. One or more domain and client isolation rules may be evaluated to determine whether access control is permitted on the object based on whether a domain identifier is associated with both the object and the user and whether a client identifier is associated with both the object and the client. A permit or deny indication may be returned based on whether or not access control is permitted on the object.

20 Claims, 5 Drawing Sheets

(56) References Cited

U.S. PATENT DOCUMENTS

| | | | |
|---|---|---|---|
| 7,591,015 | B2 | 9/2009 | Cargille et al. |
| 7,954,150 | B2 | 5/2011 | Croft et al. |
| 8,429,191 | B2 | 4/2013 | Desai et al. |
| 2003/0009685 | A1 | 1/2003 | Choo et al. |
| 2003/0041154 | A1 | 2/2003 | Tran |
| 2003/0191747 | A1 | 10/2003 | Espino |
| 2004/0239700 | A1 | 12/2004 | Baschy |
| 2004/0243835 | A1 | 12/2004 | Terzis et al. |
| 2006/0117010 | A1 | 6/2006 | Hakala |
| 2006/0248599 | A1 | 11/2006 | Sack et al. |
| 2006/0259487 | A1 | 11/2006 | Havens et al. |
| 2007/0011136 | A1 | 1/2007 | Haskin et al. |
| 2007/0016583 | A1 | 1/2007 | Lempel et al. |
| 2007/0039045 | A1 | 2/2007 | McKee et al. |
| 2007/0156691 | A1 | 7/2007 | Sturms et al. |
| 2007/0214497 | A1 | 9/2007 | Montgomery et al. |
| 2007/0282951 | A1 | 12/2007 | Selimis et al. |
| 2007/0297396 | A1 | 12/2007 | Eldar et al. |
| 2008/0016580 | A1 | 1/2008 | Dixit et al. |
| 2008/0071804 | A1 | 3/2008 | Gunda et al. |
| 2008/0126355 | A1 | 5/2008 | Rowley |
| 2008/0162707 | A1 | 7/2008 | Beck et al. |
| 2008/0229387 | A1* | 9/2008 | Baks et al. .......... 726/1 |
| 2008/0289036 | A1 | 11/2008 | Kandasamy et al. |
| 2008/0307486 | A1 | 12/2008 | Ellison et al. |
| 2009/0049047 | A1* | 2/2009 | Battepati et al. .......... 707/9 |
| 2009/0235167 | A1 | 9/2009 | Boyer et al. |
| 2010/0131559 | A1 | 5/2010 | Van Riel et al. |
| 2010/0191881 | A1 | 7/2010 | Tauter et al. |
| 2012/0030242 | A1 | 2/2012 | Nakamura et al. |
| 2012/0059799 | A1 | 3/2012 | Oliveira et al. |
| 2012/0102079 | A1 | 4/2012 | French et al. |
| 2012/0151552 | A1 | 6/2012 | Kandasamy et al. |
| 2012/0185510 | A1* | 7/2012 | Desai et al. .......... 707/785 |
| 2012/0233670 | A1 | 9/2012 | Bonnes et al. |
| 2012/0246695 | A1* | 9/2012 | Cameron .......... 726/1 |
| 2014/0019753 | A1* | 1/2014 | Lowry et al. .......... 713/155 |

OTHER PUBLICATIONS

Robinson et al., "Domain-based access control for distributed computing systems", Abstract from Software Engineering Journal, Sep. 1988, 1 page.

IBM Corp., Domain RBAC, http://publib.boulder.ibm.com/infocenter/aix/v7r1/index.jsp?topic=/com.ibm.aix.security/doc/security/domain_rbac.htm, accessed on Apr. 29, 2011, Copyright 1989, 2012, 4 pages.

IBM Corp., Role Based Access Control (RBAC), http://publib.boulder.ibm.com/infocenter/aix/v7r1/index.jsp?topic=/com.ibm.aix.security/doc/security/rbac.htm, accessed on Apr. 29, 2011, Copyright 1989, 2012, 1 page.

IBM Corp., Enhanced RBAC Mode, http://publib.boulder.ibm.com/infocenter/aix/v6r1/index.jsp?topic=/com.ibm.aix.security/doc/security/rbac_enh_mode.htm, accessed on Apr. 29, 2011, Copyright 1989, 2012, 2 pages.

Barkley, "Comparing Simple Role Based Access Control Models and Access Control Lists", Proceeding RBAC '97 Proceedings of the second ACM workshop on Role-based access control, http://delivery.acm.org/10.1145/270000/266769/p127-barkley.pdf?key1=266769&key2=2108522921&coll=ACM&CFID=1856933&CFTOKEN=5839503, accessed on Dec. 13, 2010, Aug. 11, 1997, pp. 127-132.

Shepler et al., "NFS version 4 Protocol", Network Working Group, http://tools.ietf.org/html/rfc3010, accessed on Aug. 25, 2010, Dec. 2000, 213 pages.

Gorman, "Understanding the Linux Virtual Memory Manager", http://www.phptr.com/perens2004, 2004, 748 pages.

IBM Corporation, LDAP Authentication, Sterling B2B Integrator: Security, Chapter 5, Version 5. 2, Copyright 2000, 142 pages.

IBM, "Concepts, Planning, and Installation Guide", General Parallel File System, Version 3.1, Apr. 2006, 144 pages.

Demchenko et al., "Domain Based Access Control Model for Distributed Collaborative Applications", Second IEEE International Conference on e-Science and Grid Computing, Dec. 2006, 8 pages.

IBM Corp., "Role Based Access Control, AIX V6 Advanced Security Features: Introduction and Configuration", 2007, 85 pages.

Luiz Ernesto Pinheiro Malere, Authentication using LDAP, LDAP Linux HOWTO, Additional Information and Features, http://tldp.org/HOWTO/LDAP-HOWTO/authentication.html, Mar. 18, 2007, vol. 10, Chapter 6.2, 2 pages.

Philippe Balbiani et al., A logical approach to dynamic role-based access control, AIMSA '08 Proceedings of the 13th International Conference on Artifical Intelligence: Methodology, Systems, and Applications, Copyright 2008, 17 pages.

IBM Corp., "Security in workload partition environments", Workload Partition Management in IBM AIX Version 6.1, 2008, 56 pages.

IBM, "Shapshots Reinvented: IBM XIV Storage Systems", Sep. 2008, 17 pages.

Sun Microsystems, "Lustre File System: High-Performance Storage Architecture and Scalable Cluster File Systems", White Paper, http://www.raidinc.com/pdf/whitepapers/lustrefilesystem_wp.pdf, Oct. 2008, 20 pages.

Milberg, "Cloud computing on AIX and POWER", IBM Corporation, Apr. 7, 2009, 11 pages.

Jeyapaul, "Understanding advanced AIX features: Role-based access control in simple steps", IBM Corporation, Jun. 23, 2009, 11 pages.

FreeBSD, "13.8 Groups", FreeBSD Handbook: Chapter 13 Users and Basic Account Management, http://www.freebsd.org/doc/handbook/users-group.htlm, accessed on Aug. 25, 2010, Copyright 1995, 2012, 2 pages.

Shwartz et al., "Quality of IT Service Delivery—Analysis and Framework for Human Error Prevention", Service-Oriented Computing and Application (SOCA), 2010 IEEE International Conference, Dec. 13-15, 2010, 8 pages, Perth, Washington.

Madduri et al., "Towards Mitigating Human Errors in IT Change Management Process", IBM Corporation, Lecture Notes in Computer Science, 2010, pp. 658-663,vol. 6470/2010.

Tivoli, "Architectural overview of a clustered environment", Composite Application Manager for Response Time Tracking, Version 6.0, http://publib.boulder.ibm.com/infocenter/tivihelp/v3r1/index.jsp?topic=%2Ecom.ibm.itcamrtt.doc_6.0%2FITCAMfTT_installConfig10.htm, updated Dec. 7, 2005, 3 pages.

Cendio AB, Authentication against LDAP servers, ThinLinc Administrator's Guide for ThinLinc 3.1.1post, http://www.cendio.com/downloads/updates/b3548/client-cd/doc/adminguide/html/LDAP-auth.html, Copyright 2010, Chapter 9.4, 40 pages.

IBM Systems Magazine, Privileges Granted as Needed, http://www.ibmsystemsmag.com/aix/administrator/systemsmanagement/Privileges-Granted-as-Needed/, Jan. 2010, 3 pages.

Peter Mell et al., "The NIST Definition of Cloud Computing (Draft)", Recommendations of the National Institute of Standards and Technology, Jan. 2011, 7 pages.

Chandolu et al., Introduction to Domain RBAC, IBM developerWorks, http://www.ibm.com/developerworks/aix/library/au-introdomainrbac/index.html, Sep. 20, 2011, 10 pages.

Erik Webb, Using LDAP for Authentication is Never Best Practice, erikwebb dot net, http://erikwebb.net/blog/using-ldap-authentication-never-best-practice, Published Nov. 6, 2011, 3 pages.

Office Action, dated Jul. 12, 2012, regarding U.S. Appl. No. 13/006,621, 22 pages.

Notice of Allowance, dated Dec. 17, 2012, regarding U.S. Appl. No. 13/006,621, 25 pages.

Crooks, "A Role-Based Access Control Kernel for NetBSD," EuroBSDCon 2009, Sep. 2009, 11 pages.

\* cited by examiner

CLIENT BASED RESOURCE ISOLATION WITH DOMAINS

BACKGROUND

Embodiments of the inventive subject matter generally relate to the field of computers, and, more particularly, to access control on a computer system.

Current computer system access control mechanisms in operating systems control access to resources such as login access, and file access. Some operating systems, such as conventional UNIX or UNIX-like operating systems, implement access control mechanisms of coarse granularity. On a UNIX system or UNIX-like system, system administration activities are typically performed through a root account. System administrators responsible for the administration of the system share/manage the password to the root account or use access control tools that allow access to the desired services after sufficient authentication. Some operating systems allow a finer granularity of control through role based access control (RBAC) mechanisms, where different usernames are assigned roles and only specified roles are allowed access.

BRIEF SUMMARY

One or more embodiments of the present invention may include methods, systems, and computer program products for determining access control. According to an embodiment of the present invention, a method may comprise determining, in an operating system instance, that a first access control is being attempted to control an object by a first user from a first client of a plurality of clients. A first domain identifier associated with the first user may be determined, and the first domain identifier may uniquely identify a first domain representing a first organizational entity from a plurality of domains representing a plurality of organizational entities. A first client identifier associated with the first client may be determined, and the first client identifier may uniquely identify the first client from a plurality of clients. Any domain identifiers stored in the operating system instance associated with the object may be accessed. Any of the domain identifiers may be from a set of domain identifiers that uniquely identify one or more domains of the plurality of domains representing one or more organizational entities of the plurality of organizational entities. Any client identifiers stored in the operating system instance associated with the object may be accessed. Any of the client identifiers may be from a set of client identifiers that uniquely identify one or more clients of the plurality of clients. One or more domain isolation rules may be evaluated to determine whether the first access control is permitted on the object based on whether the first domain identifier is associated with both the object and the first user, and one or more client isolation rules may be evaluated to determine whether the first access control is permitted on the object based on whether the first client identifier is associated with both the object and the first client. A permit indication may be returned that the first access control is permitted on the object if both the domain isolation rules indicate that the first domain identifier represents a domain that is permitted for the object and the client isolation rules indicate that the first client identifier represents a client permitted for the object. A deny indication may be returned that the first access control is not permitted on the object if either or both of the domain isolation rules indicate that the first domain identifier represents a domain that is not permitted for the object and the client isolation rules indicate that the first client identifier represents a client that is not permitted for the object.

DETAILED DESCRIPTION

Figure 1:
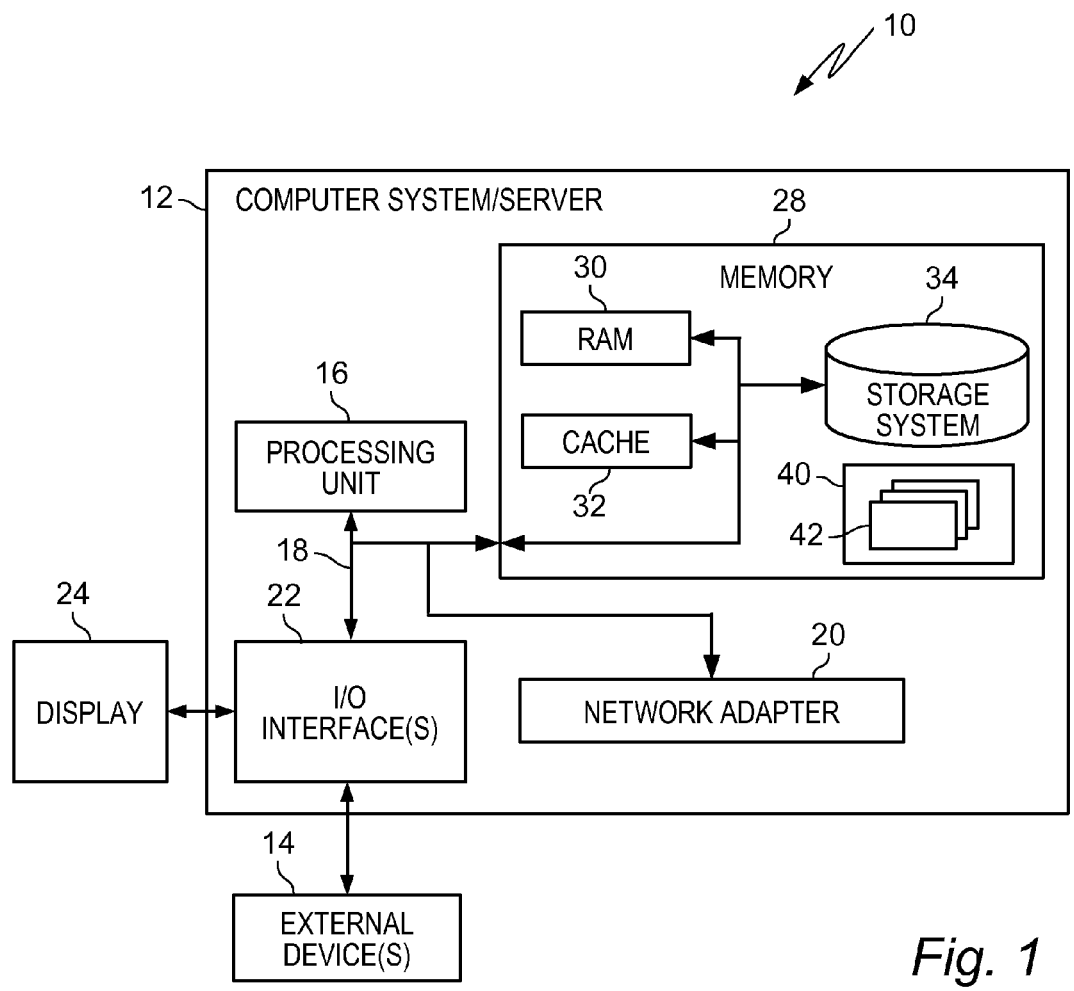
FIG. 1 depicts a cloud computing node according to an embodiment of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

It is understood in advance that although this disclosure includes a detailed description on cloud computing, implementation of the teachings recited herein are not limited to a cloud computing environment. Rather, embodiments of the present invention may be implemented in conjunction with any other type of computing environment now known or later developed, including a distributed environment like clusters of nodes in a network wherein a node represents an independently operating system.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein. Program modules 42 may be stored in a kernel of the operating system.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
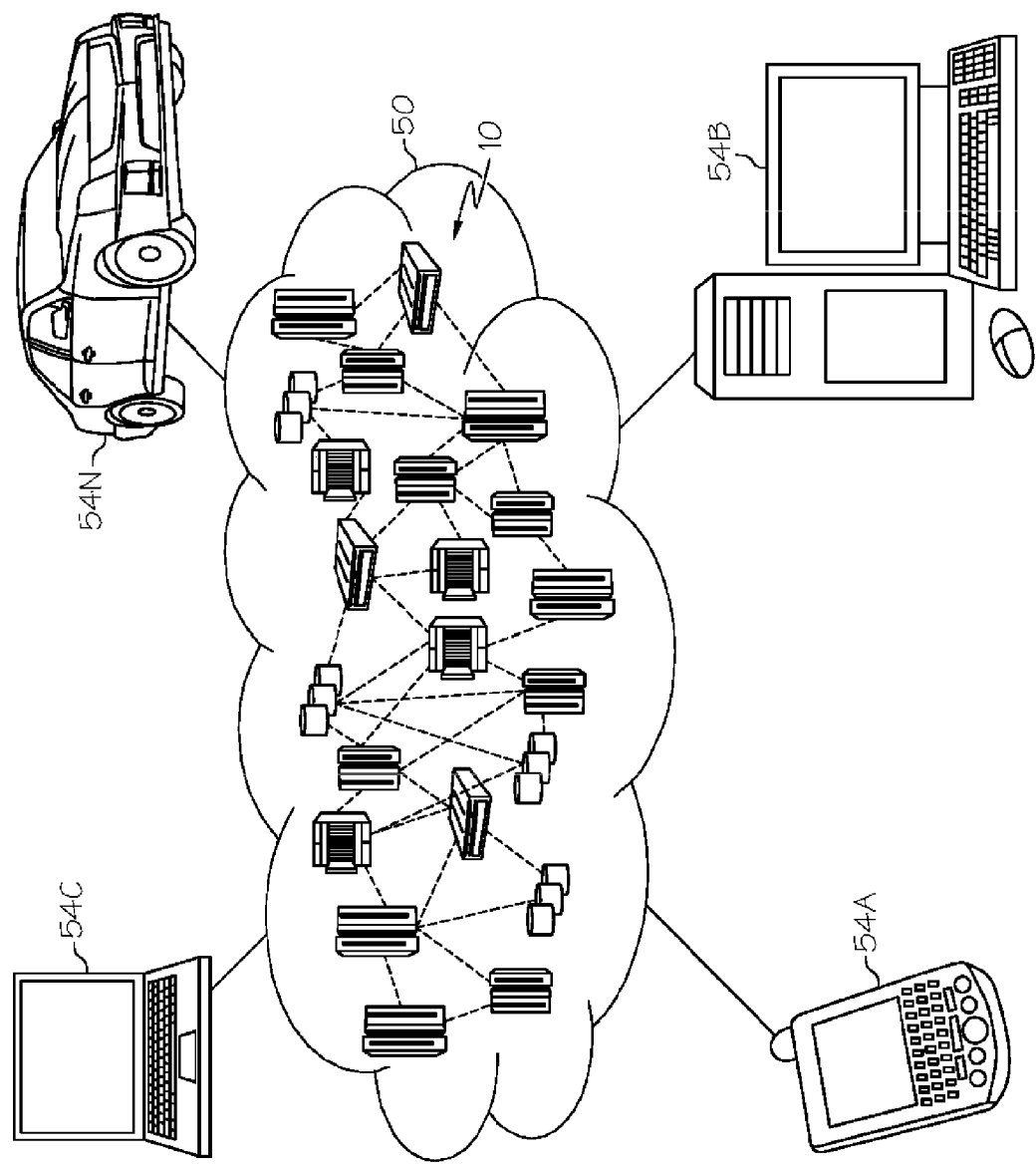
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
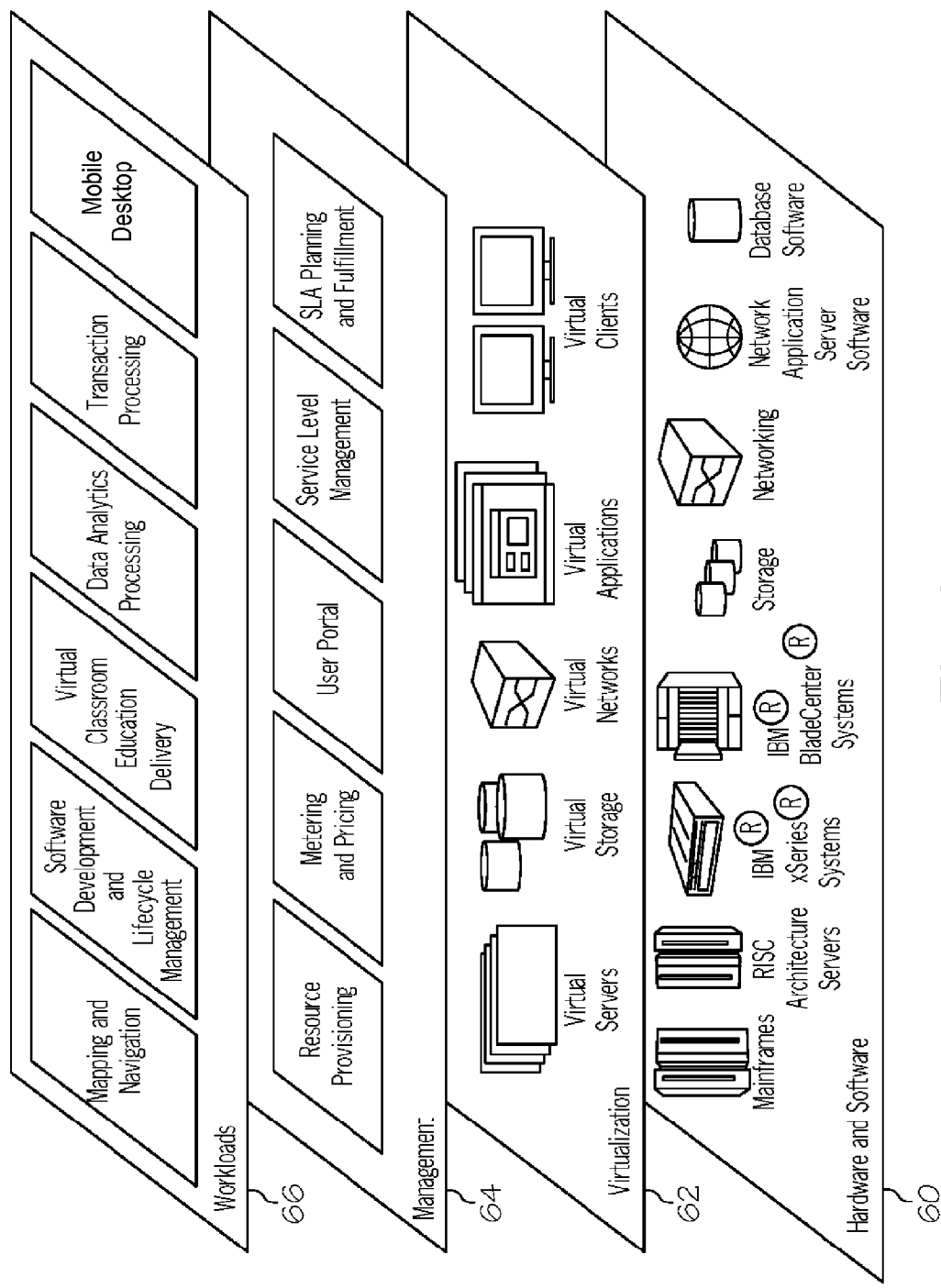
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification, such as access control, for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktop.

As noted above, systems, methods and computer program products are disclosed herein for determining access control.

An operating system ("OS") instance may support access to one or more objects (e.g., devices, file systems, file sets, volume groups, files, applications, etc.) for different departments of an organization or subsets of an organization, or different organizations, and for different purposes (e.g., management of the object, writing to the object, viewing the object, invoking an object, etc.). Objects and users may be located at different locations or addresses, but in communication with a common server. Users can be any type of computing system (e.g., computer, smart phone, PDA, etc.) described herein, whether it be network-based, cloud-based or otherwise. In an embodiment, objects and users can be in communication with a centralized lightweight directory access protocol (LDAP) server.

For example, an OS instance may support different applications/systems and data for an information technology department, a human resources department, and a finance department. The OS instance may support an electronic mail system for all three departments. The OS instance may also support a problem and ticketing system for the information technology department, a bookkeeping application for the finance department, and a job application database for the human resources department. An administrator may create domains for these different departments for any suitable administrative purpose, such as to isolate the objects of the departments (e.g., database records, department file systems, etc.) for confidentiality reasons or to conform to organizational task divisions (e.g., different information technology departments may support the different departments).

The OS instance may support different application/systems for one or more clients of an organization, of a subset of an organization, or of different organizations. The clients may be all in communication with a common server. The clients may be assigned to different internet protocol (IP) addresses, a range of IP addresses, or different names from one another. Some clients may have similar or the same domains supported by the OS instance. An administrator may create clients for any suitable administrative purpose, such as to isolate the objects of the clients, etc.

Isolation between clients and/or domains may be desired. For example, it may be desired to share some objects among clients and domains. It may also be desired to block or restrict access by certain domains and/or objects on a client. For example there may be a Client A with domains IT and HR and a Client B with domains IT and FINANCE. It may be desired to share an object with the IT domains of both Client A and Client B. It may be desired to prevent the HR domain of Client A and the FINANCE domain of Client B from sharing, viewing and/or accessing the object.

In some embodiments, a root user, super user, etc. can define domains and/or clients, associate domains and/or clients with users and objects, and/or create domain and/or client isolation rules. Domains can be defined to represent different entities (e.g., different departments, work groups of an organization). The domain can be defined to represent any grouping of users desired, including of users from more than one entity, organization, etc. Defining a domain can comprise establishing an identifier for a domain (e.g., a unique domain name, a unique alphanumerical or numerical identifier, etc.). Clients can be defined to represent different groupings, such as a location association (e.g., a specific IP address or range of IP addresses) or a name, such as a host name. The client can be defined to represent any grouping desired. Defining a client can comprise establishing an identifier for a client (e.g., a unique client name, a unique host name, a unique alphanumerical or numerical identifier, a unique IP address or range of addresses, etc.).

User identifiers and/or user credentials for different users can be associated with the appropriate domain(s) and client(s) for the different users. A set of domain and/or client isolation rules can be defined that govern access to objects based on the domain(s) and the client(s).

A kernel process associated with the OS instance, for example, can evaluate the set of rules that specify which domains and/or clients are permitted access to which object(s). A kernel may store the domain identifiers associated with users and/or objects. A kernel may store the client identifiers associated with clients and/or objects. The kernel may store the client and/or domain isolations rules. Alternatively, only a kernel of a client matching the client name with the resource and or domains or domain isolation rules can be downloaded from a centralized server. When a specific user attempts from a client to access an object to perform an operation (e.g., mount a file system or device, create a volume group, view or write to a file, etc.), the kernel process may evaluate rules for determining whether the operation by the specific user from the client is permitted to proceed on the object at the access time.

For example, a root user can create a domain for information technology administrators. There can be a system or client called "lily" in the network. The root user can define a rule that allows access to manage database objects for users who are assigned to both the information technology administrator domain on the lily client.

Figure 4:
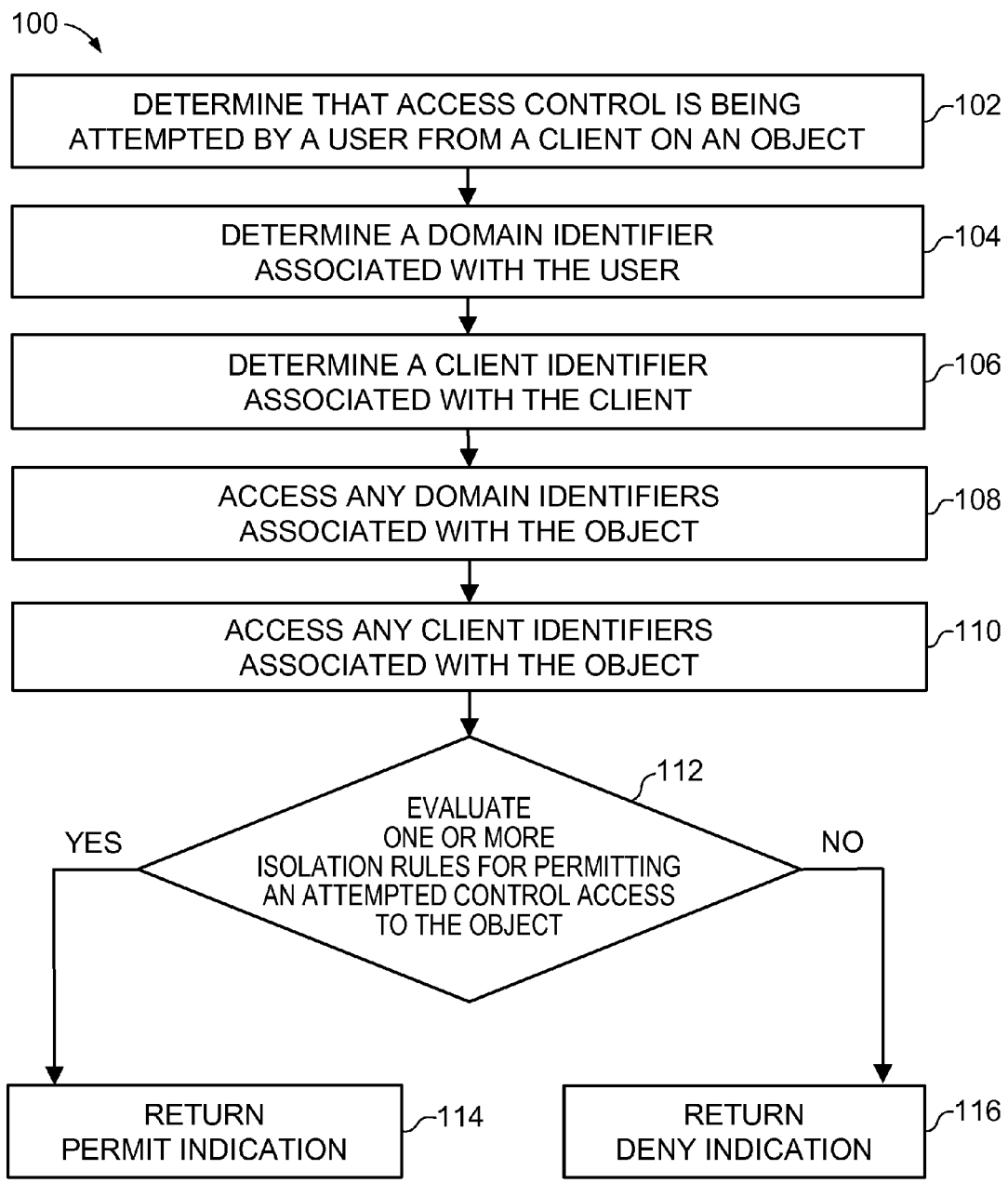
FIG. 4 depicts an exemplary method according to an embodiment of the present invention.

Referring now to FIG. 4, an exemplary method 100 of determining access control is shown. In a step 102, access control by a user to an object may be determined. To attempt login access, the user may enter login information (e.g., username, password, etc.) into a computing device for verification determination by the OS instance.

A user repository may be associated with the OS instance that includes user data (e.g., user name, user password, user profiles, user credentials, etc.) of users. The OS instance may initiate a procedure to compare the login information of the user to the user repository as part of validating if the user can access the OS instance and the object.

The user repository may be stored in a location that is accessible to the OS instance so that the OS instance can validate the user attempting access. For example, the user repository can be stored in a hard drive, server space, and/or kernel space operatively connected to the OS instance. All, part, or attributes of the user repository may be so stored.

In a step 104, a domain identifier associated with the user may be determined. The domain identifier may uniquely identify a domain that represents an organizational entity. Each domain identifier may uniquely represent a different organizational entity. The domain identifier may include a symbol, a letter, a number, a combination thereof, etc. that is suitable for identifying the domain.

One or more domain identifiers associated with the user may be stored in a location that is accessible to the OS instance so that the OS instance can determine the domain identifier(s) of the user attempting access. For example, the respective domain identifier(s) of each user can be stored in a hard drive, server space, and/or kernel space operatively connected to the OS instance. All, part, or attributes of the domain identifiers can be so stored.

For example, a domain identifier HR may be used to represent the human resources domain representing the human resources department, and a domain identifier IT may be used to represent the information technology domain representing the information technology department. Other organizational entities (e.g., finance, crisis control, management, etc.) may also have users requiring access to the OS instance, and a unique domain identifier can be associated with each such domain. A domain identifier can be associated with one or more users (e.g., Users 1 and 2 with HR; User 3 with IT). A user can be associated with one or more domain identifiers (e.g., User 1 with IT only; User 2 with IT and HR).

In a step 106, a client identifier associated with the client may be determined. The client identifier may uniquely identify a client. Each client identifier may uniquely represent a different client. The client identifier may include a symbol, a letter, a number, a combination thereof, etc. that is suitable for identifying the client. The client identifier may represent an IP address, a range of IP addresses, or a host name.

One or more client identifiers associated with the client may be stored in a location that is accessible to the OS instance so that the OS instance can determine the client identifier(s) of the client attempting access. For example, the respective client identifier(s) of each client can be stored in a hard drive, server space, and/or kernel space operatively connected to the OS instance. The kernel space may be located on the client attempting access. All, part, or attributes of the client identifiers can be so stored.

For example, a client identifier such as cec1.india.ibm.com or 9.123.44.55 may be used to represent clients as IP addresses. A client identifier of LILY could be used to represent a client as a host name. Any combination of IP addresses, symbols, names etc. may be used to identify a client.

One or more users may have access to a client. Clients may have one or more users who can access it.

In a step 108, any and/or all domain identifiers associated with the object may be accessed. A set of one or more domain identifiers may be accessed that may be associated with the object. The set may be stored in a location that is accessible to the OS instance so that the OS instance can access the domain identifier(s) associated with the object. For example, the set can be stored in a hard drive, a server space, and/or a kernel space operatively connected to the OS instance. All, part, or attributes of the set can be so stored.

Continuing with the above example, the set of one or more domain identifiers may indicate that either, both, or neither of the domain identifiers HR and IT are associated with the object on which the access control is being attempted.

In a step 110, any and/or all client identifiers associated with the object may be accessed. A set of one or more client identifiers may be accessed that may be associated with the object. The set may be stored in a location that is accessible to the OS instance so that the OS instance can access the client identifier(s) associated with the object. For example, the set can be stored in a hard drive, a server space, and/or a kernel space operatively connected to the OS instance. The client identifier of a respective client may be fetched from or stored in a kernel of the respective client. All, part, or attributes of the set can be so stored.

Continuing with the above example, the set of one or more client identifiers may indicate that all, some or none of the client identifiers cec1.india.ibm.com, 9.123.44.55, and LILY are associated with the object on which the access control is being attempted.

In a step 112, one or more isolation rules may be evaluated to determine whether the access control is permitted on the object.

One or more domain isolation rules may be evaluated to determine whether the access control is permitted on the object. The rules may define whether a domain identifier associated with a user is one of the domain identifiers in the set of domain identifiers associated with an object that is permitted access. The rules may indicate an object identifier, an object type, permitted domains, and/or denied or conflict domains.

Continuing with the above example, the rules may indicate that the domain identifier IT is permitted access to a particular object, and the domain identifier HR is not permitted access to the particular object.

In some embodiments, when the user is associated with more than one domain, the rules may specify how access is handled for such a user. For example, even though the user may be a member of a permitted domain, the rules may specify to deny access if the user is also a member of a denied domain. The rules may be indicated by a flag that represents a constraint of "ANY" or "ALL" domains for an object. If the ALL flag is set in a rule, then an operation associated with a user who is a member of all of the permitted domains indicated in the rule can be performed. Membership in only one of the permitted domains would be insufficient. The ANY or ALL flag can be represented by a single bit or a complex structure. For example, a value of 1 can indicate that ALL domains are required, while a value of 0 can indicate that ANY of the permitted domains is sufficient.

Continuing with the above example, the rules may indicate an ALL flag, such that the domain identifiers HR and IT are both required for a user to access the object. The rules may indicate an ANY flag, such that either HR or IT is required for a user to access the object.

One or more client isolation rules may be evaluated to determine whether the access control is permitted on the object. The rules may define whether a client identifier associated with a client is one of the client identifiers in the set of client identifiers associated with an object that is permitted access. The rules may indicate an object identifier, an object type, permitted clients, and/or denied or conflict clients.

Continuing with the above example, the rules may indicate that the client identifier cec1.india.ibm.com is permitted access to a particular object, and the client identifier LILY is not permitted access to the particular object.

The domain isolation and/or the client isolation rules may be stored in a location that is accessible to the OS instance so that the OS instance can access the rules. For instance, all or a subset of the domain isolation rules and/or the client isolation rules associated with the OS instance may be stored in a hard drive, a server space, and/or a kernel space operatively connected to the OS instance. The client isolation rules of a respective client may be fetched from or stored in a kernel of the respective client. All, part, or attributes of the domain isolation rules and/or the client isolation rules can be so stored.

In some embodiments, a kernel process may evaluate the domain isolation rules and/or the client isolation rules for the object and determine whether the domain(s) and/or client(s) of the user is indicated as a permitted domain and/or client. The kernel process may also determine whether the rules indicate that a user is required to be a member of any or all indicated permitted domain(s), a member of a denied or conflict domain etc. A kernel command parser may receive an instruction from user space that targets an object. User information may be loaded into the kernel space from the user repository in response to a user logging into a computing device in communication with the kernel space. On the other hand, the validation can happen in user space itself.

If an operation is permitted to be performed on the object, then operations continue at a block 114. For example, an operation may be permitted where the domain isolation rules indicate that a domain identifier associated with both the user and the object allows for permitting the user to access the object and the client isolation rules indicate that a client identifier associated with the client and the object allows for permitting the user from the client to access the object.

In some embodiments, a client identifier may be unassociated with the object. If this is the case, then the client isolation rules may permit access to the object by a user on any client, so long as the domain isolation rules permit access to the object based on an evaluation of the domain identifier(s) associated with the user and the object.

In some embodiments, there may be no domain and/or client identifiers associated with the object. If this is the case, then the domain and client isolation rules may permit access to the object by any user from any client.

In some embodiments, there may be no client identifiers associated with the object. If this is the case, then the domain and client isolation rules may permit access to the object by any user from any client, provided that the domain isolation rules are strictly followed.

If an operation is not permitted to be performed on the object, then operations continue at a block 116. For example, a deny indication may be returned that the access control is not permitted on the object if either or both of (a) the domain isolation rules indicate that the domain identifier associated with the user represents a domain that is not permitted for the object and/or (b) the client isolation rules associated with the object indicate that the first client identifier associated with the client represents a client that is not permitted for the object.

In some embodiments, a user from a client may want to determine which objects of the plurality of objects it can access based on the domains and clients associated with the object and the user. The system may receive a request from the user for an indication regarding which of a plurality of objects the user is permitted to access. The system may access any domain identifiers and any client identifiers associated with each of the plurality of objects, and evaluate the one or more domain isolation rules and the one or more client isolation rules to determine whether access by the user is permitted on each of the plurality of objects. The system may return an indication regarding which of the plurality of objects the user is permitted to access based on evaluating if both the domain isolation rules indicate that the domain identifier associated with the user represents a domain that is permitted for a particular object being evaluated of the plurality of objects and the client isolation rules indicate that the client identifier associated with the client represents a client permitted for the particular object and/or and if the particular object is unassociated with all client identifiers.

The depicted flowchart is intended to aid in understanding the inventive subject matter, and should not be used to limit embodiments. Embodiments may perform additional operations, fewer operations, operations in a different order, operations in parallel, etc., than depicted herein. For instance, an indication may not be returned that an operation is not permitted access to an object. The executing code that evaluates the domain and/or client isolation rules may invoke an error handler or generate the deny message itself. Further, the domain and/or client isolation rules may not be indexed by an object identifier. The domain and/or client isolation rules may be indexed by object type and then by object identifier. Hence in this example, the rule evaluation code would determine the type of the object and initially access the domain and/or client isolation rules with the object type.

An embodiment of the present invention can be used in a system or an OS instance that implements a role based access control (RBAC) environment. For example, a user A may be associated with an administrator role that may allow performance of operations to mount devices and/or file systems. The user A may be a member of the finance department and associated with the domain identifier FINANCE and may be existing on client LILY and associated with the client identifier LILY. A user may have configured a set of domain and client isolation rules to the objects to indicate that FINANCE is a permitted domain/domain identifier and LILY is a permitted client/client identifier for an object device DSK1 and to indicate that FINANCE is a permitted domain/domain identifier and BASIL is a permitted client/client identifier for an object device DSK2. If the user A attempts to mount DSK1, the OS instance will allow the operation(s) to mount DSK1 to proceed. If the user A attempts to mount DSK2, the OS instance will enforce the domain and client isolation rules for DSK2 and not allow the user A to mount DSK2. Hence, an organization can restrict access control based on roles, and isolate objects based on domains and clients.

Figure 5:
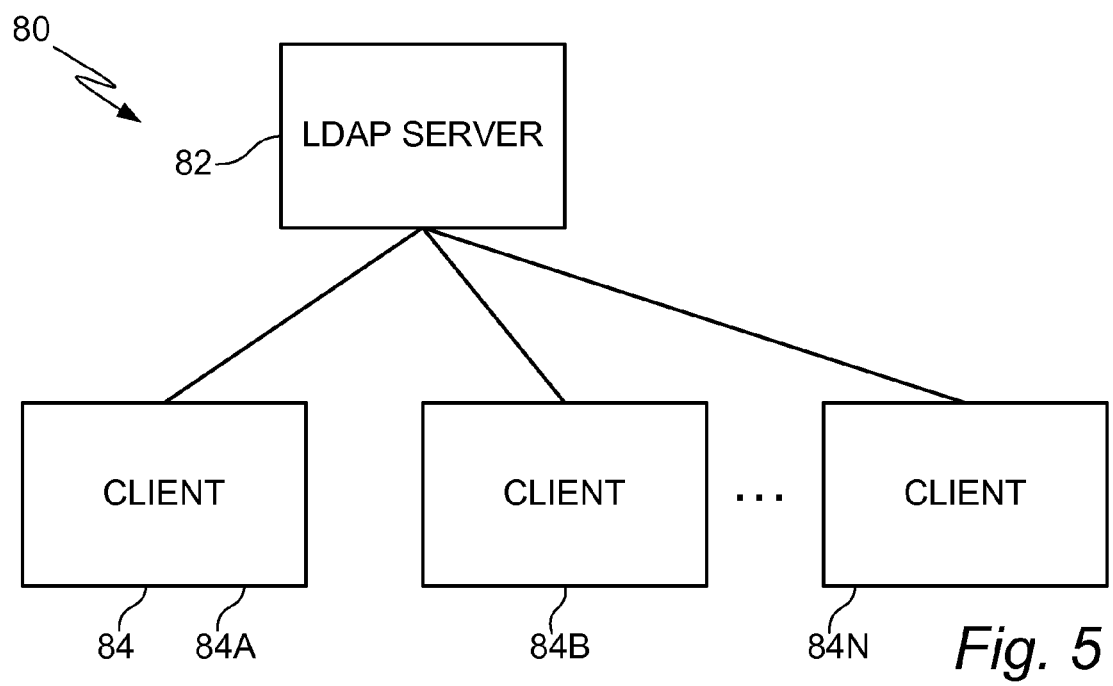
FIG. 5 depicts an exemplary system according to an embodiment of the present invention.

In another embodiment, and with reference to FIG. 5, domain identifiers and client identifiers associated with multiple domains and clients can be placed onto a centralized LDAP server 82. LDAP server 82 may be in communication with one or more clients 84, depicted in FIG. 5 as 84A, 84B, and 84N. This may allow for various LDAP clients to be able to retrieve the information from the central LDAP server & use the central LDAP server for domain resource management for one or more clients associated with the central LDAP server. Such centralization of domain tags may provide flexibility for the LDAP clients to use that information whenever they need it. For example, a respective LDAP client may make a request to the LDAP server and retrieve all the domain resource tag information for use in the respective LDAP client system. The LDAP server may only return information about the domains associated with the respective LDAP client, and not return any information for any domains not associated with the respective LDAP client.

In another embodiment, LDAP client information may be tagged or associated with domain resource/objects on a centralized LDAP server. The LDAP client may request information about which domain resource/objects are associated with the LDAP client. The LDAP server may verify the LDAP client details associated with any domain resource/objects associated with the LDAP client and provide the pertinent information to the LDAP client. If the requested LDAP client is not associated with a requested domain resource/object, then the LDAP server may not return that domain resource/object information to the LDAP client. In some embodiments, if the centralized domain resource/object is not associated with any client information, then that resource/object may be used across all the LDAP clients.

For example, there may exist an object of "/resource/obj1" with the following associated information:
/resource/obj1:
domains=payroll, operatingsystem
clients=cec1.india.ibm.com,9.123.44.55,lily
secflags=FSF_DOM_ALL In this example, "/resource/obj1" may be associated with the domains "payroll" "operatingsystem" and with the clients "cec1.india.ibm.com," "9.123.44.55," "LILY" and has a secflags set to "FSF_DOM_ALL." This information may be stored in or accessible by the LDAP server. In this example, the object "/resource/obj1" is indicated as available and if available on clients "cec1.india.ibm.com" or "9.123.44.55" or "LILY" for domains "payroll" and "operatingsystem." If the client and domain governing rules compliance are adhered to, then access for management via DOMAIN RBAC on the same shall be allowed otherwise denied. If the object /resource/obj1 exists on a particular client that is not part of the clients listing as per the entry above, access shall not be granted to that particular client. Also, the object /resource/obj1 may be downloaded only on clients associated with the object (e.g., here, "cec1.india.ibm.com" or "9.123.44.55" or "LILY"). This may not require any check for clients as the LDAP server itself is performing the verification.

In another embodiment, one or more domain resource tags (e.g., domain names or identifiers) may be associated with one or more LDAP clients for one or more objects. When a particular LDAP client requests information, the LDAP server may return all the domain resource tags available on the LDAP server that are associated with that particular LDAP client. When the particular LDAP client downloads this domain resource tag information, the Operating System kernel may check for the domain resource tags that are applicable to that client and download it to the kernel. Alternatively the LDAP clients may fetch the domains from the server that are designated to the client only.

For example, the following information may be associated with the domain payroll:
payroll:
id=10
clients=rosy.india.ibm.com The domain may be "payroll," the id may be "10," and the client may be "rosy.india.ibm.com." This example represents that restricted domain identifiers or resource tags may be allocated or downloaded into clients.

In another embodiment, in a distributed environment, the LDAP server may maintain domains and domain resources information. Domains may be associated with resources (e.g., objects). Users may be assigned domains. Based on the domains, a user may be allowed to access resources on different client systems. The LDAP client may request the information from the LDAP server and the request may be loaded into an operating system environment to control the resources from unauthorized access control using domain mechanism. The LDAP client information may be associated with the resource/object on the LDAP server. When the LDAP client requests the information from the LDAP server, the server may check the resource/object that are applicable to/associated with the client and provide the permitted information to the LDAP client.

For example, domains & resources/objects on the LDAP server may be associated with LDAP client details like a client name or an IP address or a range of IP addresses. So that, when the LDAP client requests the information from the LDAP server, the LDAP server may check and provide the corresponding, permitted domain & resource/object information to the requesting client. The LDAP client may download or fetch that permitted information to the operating system and use it. This prevents unauthorized access to a resource on the LDAP client system.

For example, a LDAP server A may be configured with LDAP Clients B, C and D. Domain and domain resources/objects may be stored on the LDAP server for clients. Consider a resource/object "/dev/fslv12" with domain "dom1" and client identifiers clientA and clientD on the LDAP server. The resource/object "/dev/fslv12" may correspond to /newfs exported on clientB, as /oldfs on clientC and /newfs on clientD. So, here with this configuration when a task is performed on clientC and clientD requiring access control on "/dev/fslv12" the domain identifiers "dom1" and rule set to "ALL" are applicable, whereas on clientB, the domain policy shall not be applied as the resource is not part of any client filtering for the clientB. This causes users to manage different file systems on different systems by having isolated domain resource and client tags. So when domain resource tags are associated with LDAP client details, then that corresponding LDAP client may be able to use that on their LDAP client. On the other hand alternatively, the resource information from LDAP server for "/dev/fslv12" shall be sent to clients clientA.in.ibm.com and clientD.in.ibm.com only on request from all clients, wherein it essentially means that resource "/dev/ fslv12" is given domain "dom1" only clients indicated and on other clients if the resource exists the domain identifiers are not applicable or it means that the resource is not in domain.

For example, the LDAP client information may be associated with the resource/object "/dev/fslv12" on the LDAP Server. The LDAP server may maintain the information as follows:

/dev/fslv12:
domains=dom1
clients=clientA.in.ibm.com, clientD.in.ibm.com
secflags=FSF_DOM_ALL Because of tagging LDAP client information to resource/objects on a centralized LDAP server, when an LDAP client requests the information, the LDAP server can verify the LDAP client details associated with resource/objects and provide the permitted information to the LDAP client. If the requesting LDAP client is not listed or associated with a requested resource/object, the LDAP server will not return that resource/object information to the client. In some embodiments, if the centralized resource/object is not associated with any client information, then that resource/object can be used across all the LDAP clients In an embodiment, the present invention is related to associating domain objects on a LDAP server with LDAP clients and storing domain objects on an LDAP server and tagging the resources with LDAP client systems. The access to the resources on the LDAP clients is restricted with domain tags for the users. The domain tags may be validated on the LDAP client systems before a user can access the resource defined in the LDAP client system.

An embodiment may include a method of associating LDAP client information with a resource/object on an LDAP server.

An embodiment may include a method of verifying LDAP client details associated with a resource/object and sharing the resource tags with LDAP clients.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention, and the practical application, and to enable others of ordinary skill in the art to understand the invention for various embodiments with various modifications as are suited to the particular use contemplated.

What is claimed is:

1. A method performed by a computer system, comprising:
   determining, in an operating system instance executed by the computer system, that a first access control is being attempted to control an object by a first user from a first client of a plurality of clients;
   determining a first domain identifier associated with the first user, wherein the first domain identifier uniquely identifies a first domain representing a first organizational entity from a plurality of domains representing a plurality of organizational entities;
   determining a first client identifier associated with the first client, wherein the first client identifier uniquely identifies the first client from a plurality of clients;
   accessing any domain identifiers stored in the operating system instance associated with the object, wherein any of the domain identifiers are from a set of domain identifiers that uniquely identify one or more domains of the plurality of domains representing one or more organizational entities of the plurality of organizational entities;
   accessing any client identifiers stored in the operating system instance associated with the object, wherein any of the client identifiers are from a set of client identifiers that uniquely identify one or more clients of the plurality of clients;
   evaluating one or more domain isolation rules to determine whether the first access control is permitted on the object based on whether the first domain identifier is associated with both the object and the first user;
   evaluating one or more client isolation rules to determine whether the first access control is permitted on the object based on whether the first client identifier is associated with both the object and the first client;
   returning a permit indication that the first access control is permitted on the object if both (1) the domain isolation rules indicate that the first domain identifier represents a domain that is permitted for the object based on whether the first domain identifier is associated with both the object and the first user and (2) the client isolation rules indicate that the first client identifier represents a client permitted for the object based on whether the first client identifier is associated with both the object and the first client; and
   returning a deny indication that the first access control is not permitted on the object if either or both of the domain isolation rules indicate that the first domain identifier represents a domain that is not permitted for the object and the client isolation rules indicate that the first client identifier represents a client that is not permitted for the object.

2. The method of claim 1, further comprising returning a permit indication that the first access control is permitted on the object if the domain isolation rules indicate that the first domain identifier represents a domain that is permitted for the object and if the object is associated with a client identifier from the first client making the access request.

3. The method of claim 1, wherein the first client represents at least one of an internet protocol address, a range of internet protocol addresses, and a host name.

4. The method of claim 3, wherein the object comprises one of a file, a file system, a volume group, a file set, a device, and any system resource.

5. The method of claim 4, further comprising evaluating the first client identifier and a second client identifier that are both associated with the object, which are stored in a centralized lightweight directory access protocol (LDAP) server.

6. The method of claim 1, further comprising evaluating the one or more domain and client isolation rules stored in a kernel of an operating system.

7. The method of claim 6, wherein the evaluating one or more client isolation rules to determine whether the first access control is permitted on the object comprises:
  determining that a plurality of client identifiers are indicated as having permission for the object; and
  determining whether the plurality of client identifiers includes the first client identifier associated with the first client.

8. The method of claim 1, further comprising:
  receiving a request for an indication regarding which of a plurality of objects the first user is permitted to access;
  accessing any domain identifiers and any client identifiers associated with each of the plurality of objects;
  evaluating the one or more domain isolation rules and the one or more client isolation rules to determine whether access by the first user is permitted on each of the plurality of objects; and
  returning an indication regarding which of the plurality of objects the first user is permitted to access based on evaluating:
    if both the domain isolation rules indicate that the first domain identifier associated with the first user represents a domain that is permitted for a particular object being evaluated of the plurality of objects and the client isolation rules indicate that the first client identifier associated with the first client represents a client permitted for the particular object; and
    if the domain isolation rules indicate that the first domain identifier represents a domain that is permitted for the particular object and if the particular object is unassociated with all client identifiers.

9. The method of claim 1, wherein the first user is a computing system.

10. The method of claim 4, further comprising evaluating the first client identifier, which is fetched from or stored in a kernel of the first client's operating system alone.

11. The method of claim 4, further comprising evaluating the second client identifier, which is fetched from or stored in a kernel of the second client's operating system alone.

12. A system for determining access control, comprising:
  a processor;
  a memory; and
  a records display program including a plurality of instructions stored in the memory that, in response to selection of an attribute, are executed by the processor to:
    determine, in an operating system instance, that a first access control is being attempted to control an object by a first user from a first client of a plurality of clients;
    determine a first domain identifier associated with the first user, wherein the first domain identifier uniquely identifies a first domain representing a first organizational entity from a plurality of domains representing a plurality of organizational entities;
    determine a first client identifier associated with the first client, wherein the first client identifier uniquely identifies the first client from a plurality of clients;
    access any domain identifiers stored in the operating system instance associated with the object, wherein any of the domain identifiers are from a set of domain identifiers that uniquely identify one or more domains of the plurality of domains representing one or more organizational entities of the plurality of organizational entities;
    access any client identifiers stored in the operating system instance associated with the object, wherein any of the client identifiers are from a set of client identifiers that uniquely identify one or more clients of the plurality of clients;
    evaluate one or more domain isolation rules to determine whether the first access control is permitted on the object based on whether the first domain identifier is associated with both the object and the first user;
    evaluate one or more client isolation rules to determine whether the first access control is permitted on the object based on whether the first client identifier is associated with both the object and the first client;
    return a permit indication that the first access control is permitted on the object if both (1) the domain isolation rules indicate that the first domain identifier represents a domain that is permitted for the object based on whether the first domain identifier is associated with both the object and the first user and (2) the client isolation rules indicate that the first client identifier represents a client permitted for the object based on whether the first client identifier is associated with both the object and the first client; and
    return a deny indication that the first access control is not permitted on the object if either or both of the domain isolation rules indicate that the first domain identifier represents a domain that is not permitted for the object and the client isolation rules indicate that the first client identifier represents a client that is not permitted for the object.

13. The system of claim 12, wherein the plurality of instructions stored in the memory that, in response to selection of an attribute, are also executed by the processor to return a permit indication that the first access control is permitted on the object if the domain isolation rules indicate that the first domain identifier represents a domain that is permitted for the object and if the object is associated with any client identifiers from the first client making the access request.

14. The system of claim 13, wherein the object comprises a system resource.

15. The system of claim 14, wherein the plurality of instructions stored in the memory that, in response to selection of an attribute, are also executed by the processor to evaluate the first client identifier and a second client identifier that are both associated with the object, the first and second client identifiers being stored in a centralized lightweight directory access protocol (LDAP) server.

16. The system of claim 15, wherein the plurality of instructions stored in the memory that, in response to selection of an attribute, are also executed by the processor to:
  receive a request for an indication regarding which of a plurality of objects the first user is permitted to access;
  access any domain identifiers and any client identifiers associated with each of the plurality of objects;
  evaluate the one or more domain isolation rules and the one or more client isolation rules to determine whether access by the first user is permitted on each of the plurality of objects; and
  return an indication regarding which of the plurality of objects the first user is permitted to access based on evaluating:
    if both the domain isolation rules indicate that the first domain identifier associated with the first user represents a domain that is permitted for a particular object being evaluated of the plurality of objects and the client isolation rules indicate that the first client identifier associated with the first client represents a client permitted for the particular object; and
    if the domain isolation rules indicate that the first domain identifier represents a domain that is permitted for the particular object and if the particular object is unassociated with all client identifiers.

17. A computer program product for determining access control, the computer program product comprising:
  a non-transitory computer readable storage medium having computer readable program code embodied therewith, the computer readable program code comprising:
  computer readable program code configured to:
    determine, in an operating system instance, that a first access control is being attempted to control an object by a first user from a first client of a plurality of clients;
    determine a first domain identifier associated with the first user, wherein the first domain identifier uniquely identifies a first domain representing a first organizational entity from a plurality of domains representing a plurality of organizational entities;
    determine a first client identifier associated with the first user, wherein the first client identifier uniquely identifies the first client from a plurality of clients;
    access any domain identifiers stored in the operating system instance associated with the object, wherein any of the domain identifiers are from a set of domain identifiers that uniquely identify one or more domains of the plurality of domains representing one or more organizational entities of the plurality of organizational entities;
    access any client identifiers stored in the operating system instance associated with the object, wherein any of the client identifiers are from a set of client identifiers that uniquely identify one or more clients of the plurality of clients;
    evaluate one or more domain isolation rules to determine whether the first access control is permitted on the object based on whether the first domain identifier is associated with both the object and the first user;
    evaluate one or more client isolation rules to determine whether the first access control is permitted on the object based on whether the first client identifier is associated with both the object and the first client;
    return a permit indication that the first access control is permitted on the object if both (1) the domain isolation rules indicate that the first domain identifier represents a domain that is permitted for the object based on whether the first domain identifier is associated with both the object and the first user and (2) the client isolation rules indicate that the first client identifier represents a client permitted for the object based on whether the first client identifier is associated with both the object and the first client; and
    return a deny indication that the first access control is not permitted on the object if either or both of the domain isolation rules indicate that the first domain identifier represents a domain that is not permitted for the object and the client isolation rules indicate that the first client identifier represents a client that is not permitted for the object.

18. The computer program product of claim 17, wherein the computer readable program code is further configured to return a permit indication that the first access control is permitted on the object if the domain isolation rules indicate that the first domain identifier represents a domain that is permitted for the object and if the object is associated with client identifiers from the client making the access request.

19. The computer program product of claim 18, wherein the first client represents at least one of an internet protocol address, a range of internet protocol addresses, and a host name.

20. The computer program product of claim 19, wherein the computer readable program code is further configured to evaluate the one or more domain and client isolation rules stored in a kernel of an operating system and a centralized lightweight directory access protocol (LDAP) server.

* * * * *